US012641043B2

(12) United States Patent
Li et al.

(10) Patent No.: US 12,641,043 B2
(45) Date of Patent: May 26, 2026

(54) AUTOMATING TASK GENERATION AND EXECUTION USING AUTONOMOUS AGENTS

(71) Applicant: Google LLC, Mountain View, CA (US)

(72) Inventors: Xiaohang Li, Cupertino, CA (US); Sikun Lin, Mountain View, CA (US); Haifeng Gong, Fremont, CA (US)

(73) Assignee: Google LLC, Mountain View, CA (US)

( * ) Notice: Subject to any disclaimer, the term of this patent is extended or adjusted under 35 U.S.C. 154(b) by 94 days.

(21) Appl. No.: 18/598,255

(22) Filed: Mar. 7, 2024

(65) Prior Publication Data
US 2025/0286837 A1 Sep. 11, 2025

(51) Int. Cl.
*H04L 51/02* (2022.01)

(52) U.S. Cl.
CPC .................................... *H04L 51/02* (2013.01)

(58) Field of Classification Search
CPC ...................................................... H04L 51/02
See application file for complete search history.

(56) References Cited

U.S. PATENT DOCUMENTS

| | | | |
|---|---|---|---|
| 2024/0296293 A1* | 9/2024 | Tsun ........................ | H04L 51/02 |
| 2025/0077777 A1* | 3/2025 | Zhang ..................... | G06F 40/40 |

* cited by examiner

*Primary Examiner* — Soe Hlaing

(74) *Attorney, Agent, or Firm* — Fish & Richardson P.C.

(57) ABSTRACT

One example method includes obtaining, using one or more autonomous agents, user information; generating, using the one or more autonomous agents and based on the user information, a plurality of prompts; generating, using the one or more autonomous agents, as a plurality of candidate digital components, one or more candidate digital components for each prompt of the plurality of prompts; determining, using the one or more autonomous agents, digital component scores of the plurality of candidate digital components; determining, using the one or more autonomous agents and based on the digital component scores of the plurality of candidate digital components, at least one digital component of the plurality of candidate digital components; and generating, using the one or more autonomous agents, an output digital component including the at least one digital component.

18 Claims, 7 Drawing Sheets

700

Processor

*710*

Memory

*720*

*750*

Storage
Device

*730*

*740*

Input/Output

*760*

Peripheral
Devices

AUTOMATING TASK GENERATION AND EXECUTION USING AUTONOMOUS AGENTS

BACKGROUND

This specification relates to data processing and automating task generation and execution using autonomous agents.

Advances in machine learning are enabling artificial intelligence to be implemented in more applications. For example, a generative model is a type of machine learning model that aims to learn and mimic the underlying distribution of a given dataset. Unlike discriminative models that focus on classifying data into predefined categories, generative models are designed to generate new data that resembles the original training data. Generative models are used in various applications, such as image generation, text synthesis, and data augmentation.

SUMMARY

In general, one innovative aspect of the subject matter described in this specification can be embodied in methods that include the actions of obtaining, using one or more autonomous agents, user information; generating, using the one or more autonomous agents and based on the user information, a plurality of prompts; generating, using the one or more autonomous agents, as a plurality of candidate digital components, one or more candidate digital components for each prompt of the plurality of prompts; determining, using the one or more autonomous agents, digital component scores of the plurality of candidate digital components; determining, using the one or more autonomous agents and based on the digital component scores of the plurality of candidate digital components, at least one digital component of the plurality of candidate digital components; and generating, using the one or more autonomous agents, an output digital component including the at least one digital component.

These and other embodiments can each optionally include one or more of the following features.

In some implementations, generating, using the one or more autonomous agents and based on the user information, the plurality of prompts includes: inputting the user information into a machine learning model; obtaining, from the machine learning model, ideas for generating candidate digital components; and generating the plurality of prompts based on the ideas.

In some implementations, the at least one digital component has a highest digital component score among the plurality of candidate digital components.

In some implementations, generating, using the one or more autonomous agents, the output digital component including the at least one digital component includes: inputting the at least one digital component into a rendering model to generate the output digital component.

In some implementations, methods include: receiving a query indicating an objective; generating one or more tasks to achieve the objective, the one or more tasks including generating the output digital component; and creating, using the one or more autonomous agents, a plurality of subtasks for generating the output digital component.

In some implementations, the plurality of subtasks includes obtaining the user information, generating the plurality of prompts, generating the plurality of candidate digital components, determining the digital component scores of the plurality of candidate digital components, determining the at least one digital component of the plurality of candidate digital components, and generating the output digital component including the at least one digital component.

In some implementations, methods include automatically executing, using the one or more autonomous agents, the plurality of subtasks.

In some implementations, the one or more tasks includes generating a digital component group, and the methods include: creating, using the one or more autonomous agents, an additional plurality of subtasks for generating the digital component group, wherein the additional plurality of subtasks for generating the digital component group includes determining target audiences associated with the digital component group, determining a bidding strategy associated with the digital component group, and adding at least one output digital component to the digital component group.

In some implementations, determining the bidding strategy associated with the digital component group includes: identifying an additional digital component group similar to the digital component group; and determining the bidding strategy associated with the digital component group based on an additional bidding strategy associated with the additional digital component group.

In some implementations, adding the at least one output digital component to the digital component group includes: adding the output digital component to the digital component group.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
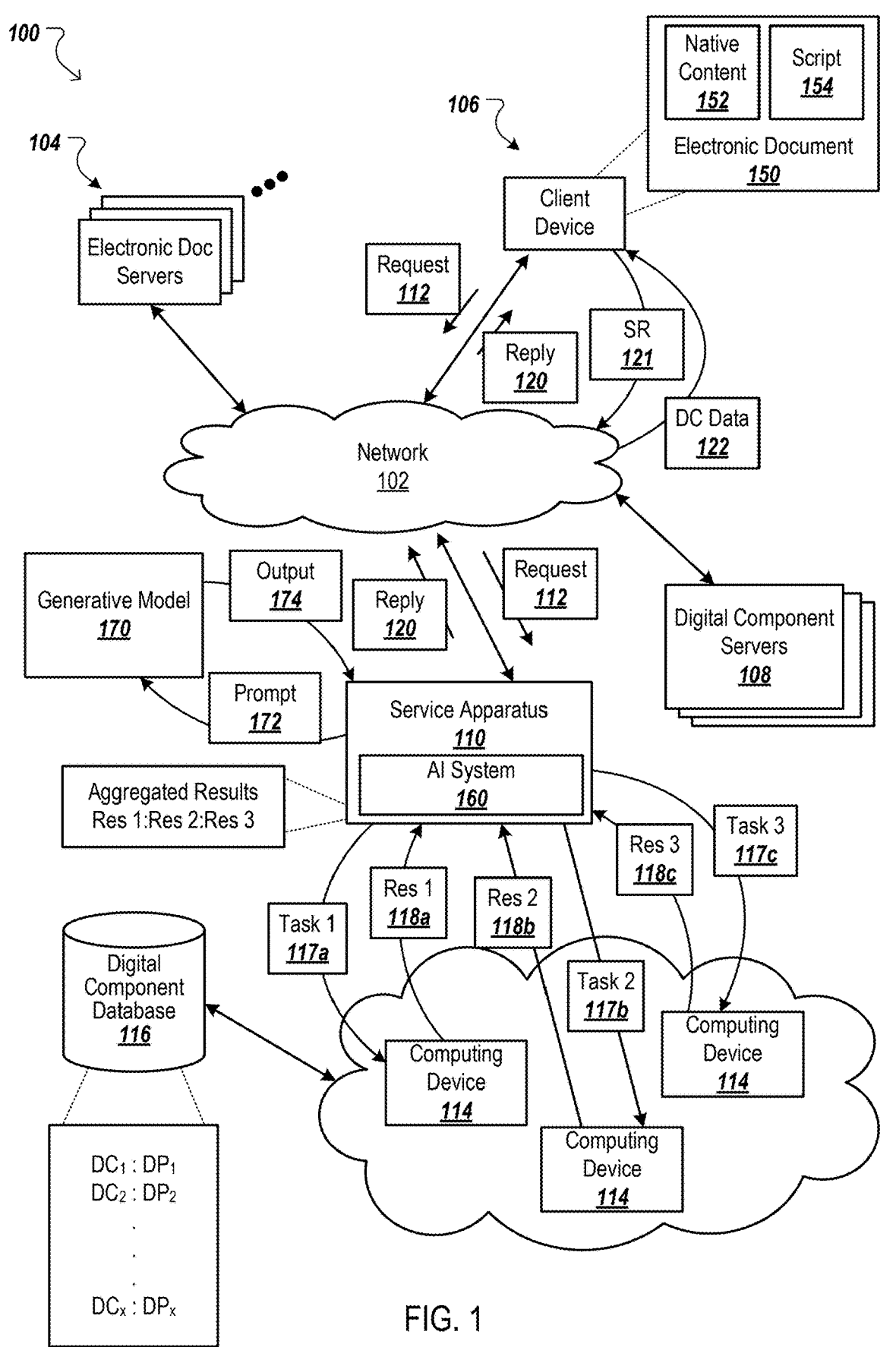
FIG. 1 is a block diagram of an example environment for using autonomous agents to automate digital component task generation and execution, according to an implementation of the present disclosure.

This specification describes techniques for using autonomous agents to automate digital component task generation and execution. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Artificial intelligence (AI) is a segment of computer science that focuses on the creation of models that can perform tasks autonomously (e.g., with little to no human intervention). Artificial intelligence systems can utilize, for example, one or more of machine learning, natural language processing, or computer vision. Machine learning, and its subsets, such as deep learning, focus on developing models that can infer outputs from data. The outputs can include, for example, predictions and/or classifications. Natural language processing focuses on analyzing and generating human language. Computer vision focuses on analyzing and interpreting images and videos. Artificial intelligence systems can include generative models that generate new content, such as images, videos, text, audio, and/or other content, in response to input prompts and/or based on other information.

The current state of digital advertising presents many challenges to users struggling to maximize their online presence, drive traffic, and convert leads. While a user can use AI to automate some operations of the digital advertising process, in particular the generation of the digital components, the process can still be highly manual. Manual processes for crafting, optimizing, and maintaining advertisement campaigns can consume substantial resources and cause suboptimal outcomes due to human error or insufficient attention to detail.

Additionally, with frequent changes in consumer behaviors, algorithm updates, digital component formats, targeting options, measurement methodologies, and/or competitive landscapes, staying ahead requires constant adaptation, experimentation, and learning. However, the human mind faces challenges in managing and processing the multitude of inputs required for digital advertising due to the human mind's limited capacity and susceptibility to errors. The complexity and volume of data involved often exceed what can be effectively handled manually. Therefore, relying solely on human expertise and manual intervention often falls short of meeting these evolving needs, resulting in lost opportunities and squandered investments.

These deficiencies can be illustrated by the following example. Assume a user has an objective of increasing the sale of a product. To achieve this objective, the user must plan and prioritize a series of tasks, including launching an advertisement campaign, creating an advertisement, selecting a bidding strategy, and monitoring the campaign's outcome. These tasks can be executed manually and/or with the assistance of AI. However, each task often requires significant input from the user. For instance, consider the creation of an advertisement. While a user can use a generative model to create the advertisement, the model typically needs specific inputs from the user, such as the advertisement's content, theme, and any constraints. Additionally, the user must provide further inputs, such as the target audiences and bidding strategy, to ensure the advertisement reaches its intended audiences and achieves the budget goal of the user. This process necessitates users to provide detailed inputs and manage various progress milestones.

In some implementations, the techniques described throughout this specification enable to use autonomous agents to automatically generate, prioritize, and execute the tasks to achieve an objective of a user (e.g., "increasing the sale of product X by Y % within a budget of Z"). In some cases, a task creation agent can use, for example, a large language model (LLM) to create tasks/subtasks, given the objective of the user. A task prioritization agent can prioritize the tasks/subtasks and an execution agent can execute the prioritized tasks/subtasks. A summarization agent can report the statuses of the task/subtasks to the user.

Additionally, in some implementations, the techniques described throughout this specification enable to automate the operations associated with digital components and/or digital component groups without explicit input from a user. For example, an AI system can employ autonomous agents to gather user information that is not directly provided by the user. These agents can then generate a variety of candidate digital components based on the user information. Using these agents, the AI system can identify at least one digital component from the candidate digital components that is likely to fulfill the user's objective. Additionally, in some cases, the autonomous agents can create and execute tasks related to the generated digital component, such as forming a digital component group and determining a bidding strategy, all without requiring input from the user.

The techniques described herein can be implemented to achieve the following advantages. As noted, in some cases, the techniques described herein enable to automate the operations associated with digital components and/or digital component groups without explicit input from a user. By minimizing the need for user input, these techniques can enhance the efficiency of digital advertising, eliminating the need to wait for user input to progress through multiple tasks.

In this regard, the techniques described herein achieve significant advantages for AI-implemented digital advertising systems. Moreover, the improved AI-implemented digital advertising systems further result in computing and network resource efficiencies. For example, the techniques described herein enable to identify highly relevant user information for generating digital components and automatically identify a suitable digital component among a plurality of candidate digital components. This can reduce the significant quantity of resources stemming from generating undesirable digital components, as well as evaluating and investigating the users' feedbacks on these undesirable digital components.

Additionally, in some cases, the techniques described herein provide various levels of automation (e.g., automatic, semi-automatic, or manual) and/or various granularities of tasks to be generated/executed (e.g., coarse or fine) for the user to choose from. This can increase flexibility and customization. Users can tailor the level of automation and granularity of tasks to their specific needs and preferences, allowing for a more personalized and efficient workflow.

As used throughout this document, the phrase "digital component" refers to a discrete unit of digital content or digital information (e.g., a video clip, audio clip, multimedia clip, gaming content, image, text, bullet point, AI output, language model output, or another unit of content). In some implementations, a digital component can electronically be stored in a physical memory device as a single file or in a collection of files, and digital components can take the form of video files, audio files, multimedia files, image files, or text files and include advertising information, such that an advertisement is a type of digital component.

FIG. 1 is a block diagram of an example environment 100 for using autonomous agents to automate digital component task generation and execution, according to an implementation of the present disclosure. The example environment 100 includes a network 102, such as a local area network (LAN), a wide area network (WAN), the Internet, or a combination thereof. The network 102 connects electronic document servers 104, client devices 106, digital component servers 108, and a service apparatus 110. The example environment 100 may include many different electronic document servers 104, client devices 106, and digital component servers 108.

A client device 106 is an electronic device capable of requesting and receiving online resources over the network 102. Example client devices 106 include personal computers, gaming devices, mobile communication devices, digital assistant devices, augmented reality devices, virtual reality devices, and other devices that can send and receive data over the network 102. A client device 106 typically includes a user application, such as a web browser, to facilitate the sending and receiving of data over the network 102, but native applications (other than browsers) executed by the client device 106 can also facilitate the sending and receiving of data over the network 102.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

As illustrated, the client device 106 is presenting an electronic document 150. An electronic document is data that presents a set of content at a client device 106. Examples of electronic documents include webpages, word processing documents, portable document format (PDF) documents, images, videos, search results pages, and feed sources. Native applications (e.g., "apps" and/or gaming applications), such as applications installed on mobile, tablet, or desktop computing devices are also examples of electronic documents. Electronic documents can be provided to client devices 106 by electronic document servers 104 ("Electronic Doc Servers").

For example, the electronic document servers 104 can include servers that host publisher websites. In this example, the client device 106 can initiate a request for a given publisher webpage, and the electronic document server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally (i.e., on the client device). Alternatively, or additionally, the client device 106 can initiate a request to execute the app, which is transmitted to a cloud server. In response to receiving the request, the cloud server can execute the application and stream a user interface of the application to the client device 106 so that the client device 106 does not have to execute the app itself. Rather, the client device 106 can present the user interface generated by the cloud server's execution of the app and communicate any user interactions with the user interface back to the cloud server for processing.

Electronic documents can include a variety of content. For example, an electronic document 150 can include native content 152 that is within the electronic document 150 itself and/or does not change over time. Electronic documents can also include dynamic content that may change over time or on a per-request basis. For example, a publisher of a given electronic document (e.g., electronic document 150) can maintain a data source that is used to populate portions of the electronic document. In this example, the given electronic document can include a script, such as the script 154, that causes the client device 106 to request content (e.g., a digital component) from the data source when the given electronic document is processed (e.g., rendered or executed) by a client device 106 (or a cloud server). The client device 106 (or cloud server) integrates the content (e.g., digital component) obtained from the data source into the given electronic document to create a composite electronic document including the content obtained from the data source.

In some situations, a given electronic document (e.g., electronic document 150) can include a digital component script (e.g., script 154) that references the service apparatus 110, or a particular service provided by the service apparatus 110. In these situations, the digital component script is executed by the client device 106 when the given electronic document is processed by the client device 106. Execution of the digital component script configures the client device 106 to generate a request for digital components 112 (referred to as a "component request"), which is transmitted over the network 102 to the service apparatus 110. For example, the digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the service apparatus 110 can use to select one or more digital components, or other content, provided in response to the request. The component request 112 is transmitted, by the client device 106, over the network 102 (e.g., a telecommunications network) to a server of the service apparatus 110.

The component request 112 can include event data specifying other event features, such as the electronic document being requested and characteristics of locations of the electronic document at which digital component can be presented. For example, event data specifying a reference (e.g., a Uniform Resource Locator (URL)) to an electronic document (e.g., webpage) in which the digital component will be presented, available locations of the electronic documents that are available to present digital components, sizes of the available locations, and/or media types that are eligible for presentation in the locations can be provided to the service apparatus 110. Similarly, event data specifying keywords associated with the electronic document ("document keywords") or entities (e.g., people, places, or things) that are referenced by the electronic document can also be included in the component request 112 (e.g., as payload data) and provided to the service apparatus 110 to facilitate identification of digital components that are eligible for presentation with the electronic document. The event data can also include a search query that was submitted from the client device 106 to obtain a search results page.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above. In some cases, the component request 112 includes an objective that a user associated with the client device 106 wants to achieve.

The service apparatus 110 chooses digital components (e.g., third-party content, such as video files, audio files, images, text, gaming content, augmented reality content, and combinations thereof, which can all take the form of advertising content or non-advertising content) that will be presented with the given electronic document (e.g., at a location specified by the script 154) in response to receiving the component request 112 and/or using information included in the component request 112.

In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106.

Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the service apparatus 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components ($DC_{1-x}$). The millions of available digital components can be indexed, for example, in a digital component database 116. Each digital component index entry can reference the corresponding digital component and/or include distribution parameters ($DP_1$-$DP_x$) that contribute to (e.g., trigger, condition, or limit) the distribution/transmission of the corresponding digital component. For example, the distribution parameters can contribute to (e.g., trigger) the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. Additionally, or alternatively, the distribution parameters can include embeddings that can use various different dimensions of data, such as website details and/or consumption details (e.g., page viewport, user scrolling speed, or other information about the consumption of data). The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., ranking score, or some other specified value) that is used for evaluating the eligibility of the digital component for distribution/transmission (e.g., among other available digital components).

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the service apparatus 110. For example, the results 118a-118c provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The service apparatus 110 aggregates the results 118a-118c received from the set of multiple computing devices 114 and uses information associated with the aggregated results to select one or more digital components that will be provided in response to the request 112. For example, the service apparatus 110 can select a set of winning digital components (one or more digital components) based on the outcome of one or more content evaluation processes, as discussed below. In turn, the service apparatus 110 can generate and transmit, over the network 102, reply data 120 (e.g., digital data representing a reply) that enable the client device 106 to integrate the set of winning digital components into the given electronic document, such that the set of winning digital components (e.g., winning third-party content) and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a URL) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data 122 that presents the given winning digital component in the electronic document at the client device 106.

When the client device 106 receives the digital component data 122, the client device will render the digital component (e.g., third-party content), and present the digital component at a location specified by, or assigned to, the script 154. For example, the script 154 can create a walled garden environment, such as a frame, that is presented within, e.g., beside, the native content 152 of the electronic document 150. In some implementations, the digital component is overlaid over (or adjacent to) a portion of the native content 152 of the electronic document 150, and the service apparatus 110 can specify the presentation location within the electronic document 150 in the reply 120. For example, when the native content 152 includes video content, the service apparatus 110 can specify a location or object within the scene depicted in the video content over which the digital component is to be presented.

The service apparatus 110 can also include an AI system 160 configured to use autonomous agents to create and process tasks. As described in more detail throughout this specification, the AI system 160 can include a task creation agent configured to create tasks and/or subtasks to achieve an objective (e.g., an objective indicated by the request 112). The AI system 160 can include a task prioritization agent configured to prioritize the tasks and/or subtasks and an execution agent configured to automatically execute the tasks and/or subtasks. The AI system 160 can include a summarization agent configured to report statuses of the tasks and/or subtasks, for example, to the client device 106.

Autonomous agents are software programs that interact with their environment based on states and events, without requiring direct instruction from the user. Autonomous agents act on behalf of the user and in their best interest. An autonomous agent can range from simple programs with a few rules to complex systems. The autonomous agents can find applications in areas where continuous data analysis and monitoring are beneficial, such as handling data streams and large databases, as well as in situations requiring routine responses to events. In some cases, the autonomous agents can incorporate one or more LLMs. These autonomous agents can plan how to execute tasks from start to finish, engaging in iterative interactions with LLMs (via application programming interface (API) calls, which involve one application requesting data or services from another), monitoring outcomes, and utilizing additional digital tools to achieve a specific objective.

Generative models are designed to generate new data that resembles a given training dataset and operate by learning underlying patterns, structures, and relationships present in the training dataset, enabling them to create new samples that share similar characteristics. The primary goal of generative models is to capture inherent complexity of a data distribution, allowing them to produce outputs that exhibit the same diversity and variability found in the original dataset.

One of the fundamental concepts in generative models is generation of data from random noise or latent variables. The generative models create a mapping between a latent space and data space, permitting generation of entirely novel instances that possess meaningful features. Generative models can be broadly categorized into two main types: likelihood-based and adversarial-based.

Likelihood-based generative models, such as Variational Autoencoders (VAEs) and Autoregressive Models, focus on learning the probability distribution of the data. VAEs, for instance, employ an encoder-decoder architecture to map data points into a latent space and then decode them back into the data space. This process encourages the model to learn a more structured and continuous representation of the data distribution.

Adversarial-based generative models, most notably Generative Adversarial Networks (GANs), leverage a different approach. GANs consist of two neural networks: a generator and a discriminator. The generator aims to produce data that is indistinguishable from real data, while the discriminator tries to distinguish between real and generated data. This adversarial process results in the generator improving over time and producing increasingly convincing outputs.

Figure 2:
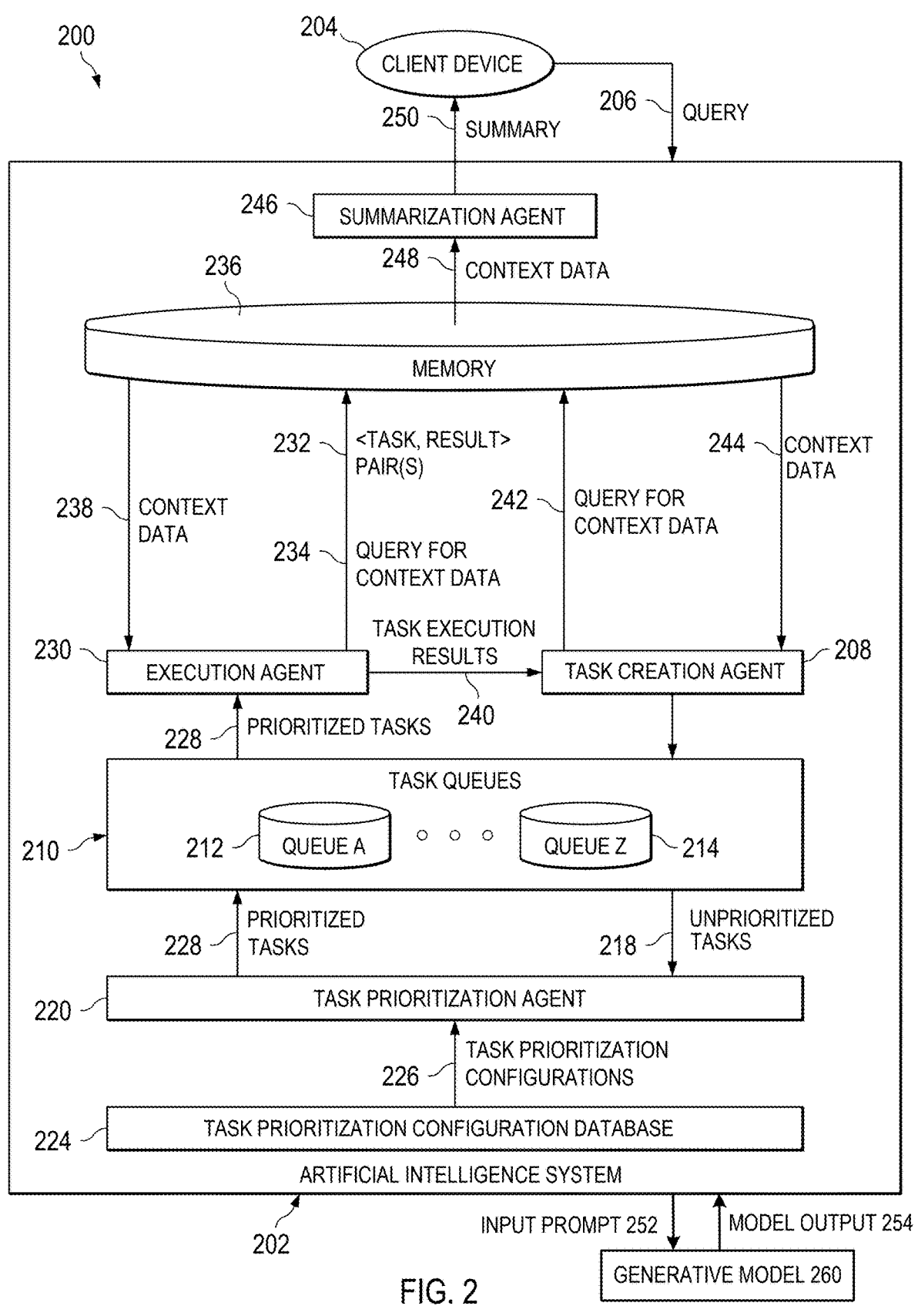
FIG. 2 is a block diagram illustrating interactions between an AI system, a generative model, and a client device implementing innovative aspects of this specification, according to an implementation of the present disclosure.

FIG. 2 is a block diagram of an example system 200 illustrating interactions between an AI system 202, a generative model 260, and a client device 204, according to an implementation of the present disclosure. In some cases, the client device 204 transmits a query 206, which indicates an objective, to the AI system 202. The AI system 202 can use autonomous agents to create and process tasks/subtasks for achieving the objective. In some situations, the AI system 202, the generative model 260, and the client device 204 can, respectively, be the same or similar to the AI system 160, the generative model 170, and the client device 106 of FIG. 1.

The client device 204 can transmit a query 206 to the AI system 202. In some cases, the query 206 can be a request for the AI system 202 to generate and/or execute tasks associated with promoting a product and/or a service (e.g., an advertisement campaign or a marketing event).

In some cases, the AI system 202 can provide more than one level of automation for a user to choose from. For example, the AI system 202 can provide a manual mode, a semi-automatic mode, and an automatic mode. In the manual mode, the query 206 can include specific tasks intended to be executed by the AI system 202. For example, the query 206 can include descriptions or images of a product for the AI system 202 to generate an advertisement of the product. In contrast, in the automatic mode, the query 206 does not include detailed inputs such as product descriptions or images. Instead, the query 206 can just include an objective, key performance indicator(s), and/or desired results to guide the AI system 202 in fulfilling the user's expectations. For example, the query 206 can include a prompt such as "increasing the sale of product X by Y % within a budget of Z" or "here are all my products. I want to achieve an overall revenue of X." In the automatic mode, in addition to generating task(s), the AI system 202 can automatically execute the generated task(s). The semi-automatic mode can be similar to the automatic mode, except that, under the semi-automatic mode, the task(s) generated by the AI system 202 need approval from the user to be subsequently executed.

In some cases, the query 206 can include target audiences, preferred tone and style, industry jargon, and/or other type of input for guiding the AI system 202 in fulfilling the user's expectations. In some cases, the query 206 can include historical data (e.g., historical campaign performance data) to enable the AI system 202 to recognize trends, patterns, and areas requiring improvements.

In some implementations, the AI system 202 can obtain additional query data that includes data not in the query 206 and can limit contents generated by the AI system 202. For example, the additional query data can include but not limited to, the geographic location(s) to which the generated contents will be distributed, a language used in the generated contents, and/or a vertical industry that will be used to distribute the generated contents. For example, an advertiser can indicate that their product(s) and/or service(s) is aimed for distribution in North American markets, should be in English language, and/or is aimed at the fashion clothing vertical industry. In some examples, the user provides the additional query data in the same query 206. In other examples, the additional query data is input separately from the query 206. For example, the AI system 202 can generate one or more follow-up questions in response to the query 206, where the one or more follow-up questions are used to solicit input of the additional query data from the user. For example, the follow-up question(s) can be "which geographic location(s) will your product(s) and/or service(s) be distributed in," "which language should the digital component be in," and/or "which vertical market(s) will your product(s) and/or service(s) be directed to?"

In some examples, the AI system 202 can collect additional query data not input directly by the user. In some cases, the AI system 202 can obtain an identity of an entity associated with the query 206. The identity can include at least one identifier, such as a company or corporation name, a URL, a telephone number, employer ID number, or other means of identifying an entity. The AI system 202 can obtain the at least one identifier using, for example, an account of the user who submitted the query 206 or from a partner system. The AI system 202 can automatically identify, based on the identity of the entity, a data source including information about the entity. These data sources can be, but are not limited to, web pages (e.g., the entity's landing page), review compilation pages (e.g., google.com, yelp.com, and crunchbase.com), federal and/or state registries (e.g., the Delaware entity search tool), private databases, news articles, or other suitable sources. In some implementations, a data crawler application automatically queries a plurality of databases, performs searches, and extracts information from the results in response to the process being triggered. The information obtained from these data sources can be bulk text data, a combination of text and images, metadata, or other suitable data and/or media.

In some examples, the AI system 202 can perform a semantic analysis of the collected information for at least one data source. In some implementations, a single data source is analyzed using semantic analysis. In some implementations, all collected information is analyzed. The semantic analysis can be performed by one or more machine learning algorithms with an overall objective of generating one or more entity attributes associated with the entity. In some cases, the AI system 202 can perform the semantic analysis using an array of neural networks that operate in series or can include machine learning algorithms that operate in parallel, or otherwise independently of each other. In some implementations, traditional data analysis can be performed in addition to, or separately from, the machine learning processes. The one or more entity attributes can include, for example, the geographic location(s) that a digital component will be distributed, a language used in the digital component, and/or a vertical industry that will be used to distribute the digital component.

The AI system 202 can store the collected data in a collected data database. For example, the AI system 202 can index the collected data to the query used to collect the data and/or an entity characterized by the collected data so that the collected data can be retrieved from the collected data database for additional operations performed by the AI system 202.

In some examples, the task creation agent 208 can generate, based on the query 206 and/or additional query data, one or more tasks and/or request additional input from the user for generating task(s). In some implementations, the task creation agent 208 can generate an input prompt using the query 206 and/or additional query data.

In some cases, the input prompt can include the query 206 and a set of constraints generated based on, for example, the additional query data. The task creation agent 208 can input the input prompt to a large language model (LLM), which can then generate, based on the input prompt, one or more tasks associated with the query 206. For example, the task creation agent 208 can insert, into the input prompt, one or more of the entity attribute(s) corresponding to the entity associated with the user. In some implementations, the one or more of the entity attribute(s) inserted into the prompt operates as a contextual constraint that limits tasks created by LLM responsive to the input prompt. For example, the entity attribute(s) can limit the content created by the LLM to subject matter specified by the entity attribute(s) that is included in the prompt as a contextual constraint.

As an example, assume that the query 206 is "increasing the sale of product X by Y % within a budget of Z." Also assume that the additional query data indicates that the product X is intended for distribution to users in Japan who are interested in the fashion clothing vertical market. The input prompt can take the following form:

Generate a good_output: tasks to achieve the objective of "increasing the sale of product X by Y % within a budget of Z." The good_output should be directed to the fashion clothing vertical market in Japan.

In some cases, the LLM is included in the task creation agent 208. In other cases, the LLM is not included in the task creation agent 208. For example, the LLM can be the generative model 260 that is external to the AI system 202. In such case, the AI system 202 can transmit the input prompt 252 to the generative model 260, and receive the model output 254 including the tasks generated by the generative model 260 responsive to the input prompt 252.

The generative model 260 can be, for example, a text-to-text generative model, a text-to-image generative model, a text-to-video generative model, an image-to-image generative model, or any other type of generative model. Although a single generative model 260 is depicted in FIG. 2, the generative model 260 can be a set of different generative models that can be invoked for different tasks for which the different generative models are specially trained. For example, one generative model within the set of generative models may be specially trained to generate tasks, while another model may be specially trained to generate digital components. Furthermore, the set of models can include a generalized generative model that is larger in size, and capable of generating large amounts of diverse datasets, but this generalized model may have higher latency than the specialized models, which can make it less desirable for use in real-time operations, depending on time latency constraints required to generate content.

In some examples, the LLM used to generate the tasks can be refined. For example, the AI system 202 can generate a plurality of candidate tasks using the LLM. By exploring the plurality of candidate tasks, the AI system 202 can obtain performance data indicating the performance of each candidate task. The AI system 202 can identify a candidate task resulting in good performance and generate, based on the candidate task, training data. The AI system 202 can then refine the LLM using the training data.

For example, assume that the query 206 causes to generate a task of generating a digital component for sunglasses. To explore what digital component can result in good performance, the AI system 202 can generate a plurality of candidate tasks, each candidate task directed to a respective background image. For example, the plurality of candidate tasks can include generating a digital component for sunglasses with Fuji Mountain scene in the background, generating a digital component for sunglasses with a snow scene in the background, generating a digital component for sunglasses with a backyard scene in the background, and generating a digital component for sunglasses with an Eiffel Tower scene in the background. The digital components generated based on these candidate tasks can be served to identify a digital component having the best performance (e.g., highest clickthrough rate (CTR), conversion rate (CVR), and/or cost per day (CPD)). The candidate task used to generate the identified digital component can then be used to generate training data and refine the LLM.

By refining in this manner, the LLM can be encouraged to generate more tasks similar to the one that received positive performance. On the other hand, if a candidate task receives negative performance, the LLM receives a penalty. This feedback signals the LLM to avoid generating similar tasks in the future and strive for better results.

In some cases, after generating the one or more tasks, the task creation agent 208 can generate one or more sub-tasks of a task. In some examples, the task creation agent 208 can include a set of sub-agents, each sub-agent configured to generate one or more sub-tasks. For example, the task creation agent 208 can include an image creation sub-agent configured to generate image-related sub-tasks (e.g., sub-tasks associated with generating background and foreground images used in advertisements), a text creation sub-agent configured to generate text-related sub-tasks (e.g., text used in advertisements), a video creation sub-agent configured to generate video-related sub-tasks (e.g., videos used in advertisements), a digital component enhancement sub-agent configured to generate digital component enhancement-related sub-tasks, and/or a budget controlling sub-agent configured to generate budget control-related sub-tasks.

After generating a task, the task creation agent 208 can determine whether to generate sub-task(s) for the task. If the task creation agent 208 determines to generate sub-task(s) for the task, the task creation agent 208 can identify one or more sub-agents to generate the sub-task(s). For example, the query 206 can include "increasing the sale of product X by Y % within a budget of Z." The task creation agent 208 can generate one or more tasks for the query 206, including a task of "generating a digital component for product X." After generating this task, the task creation agent 208 can determine that sub-tasks are needed to fulfill this task. The task creation agent 208 can identify the image creation sub-agent, the text creation sub-agent, and the digital component enhancement sub-agent for generating the sub-tasks and input the task of "generating a digital component for product X" to the sub-agents. The image creation sub-agent, the text creation sub-agent, and the digital component enhancement sub-agent can then generate, for example, the sub-tasks of generating a background image, generating a text, and enhancing the advertisement, respectively.

In some implementations, the AI system 202 can provide more than one options of granularity for the task generation and/or execution. For example, the AI system 202 can provide a coarse granularity mode and a fine granularity mode, where the fine granularity allows to generate more detailed and specific tasks than the coarse granularity mode. Accordingly, when the AI system 202 executes the tasks, the fine granularity allows the AI system 202 to execute more detailed and specific tasks than the coarse granularity mode.

In some cases, the AI system 202 can provide an interface for users to interact with the AI system 202. For example, the AI system 202 can display, using the interface, a set of tasks and/or sub-tasks created by the autonomous agents (e.g., the task creation agent 208 and/or the sub-agents). The interface can enable a user to check or uncheck tasks and/or subtasks. In some cases, the created tasks can be presented as graphs and/or trees.

In some implementations, the AI system 202 can determine that more information is needed from the user before the AI system 202 can generate any task/sub-tasks. Accordingly, the AI system 202 can transmit a request to the client device 204 to request more information. For example, the AI system 202 can receive a query of "boost my ice cream sale with online ads." The AI system 202 can determine that it needs to understand the current state of the ice cream business and what tasks need be completed to achieve the marketing goals. Accordingly, the AI system 202 can transmit to the client device 204 a request of "I need more information about what task to perform next. Can you provide me with more context?"

In some cases, the AI system 202 can store the generated task(s)/sub-tasks(s) in task queue(s) 210. In some cases, there are more than one task queues (e.g., queue A 212 to queue Z 214), and each task queue is configured to store the task(s)/sub-task(s) of a certain type. For example, the task queues can include a format task queue configured to store format tasks, a targeting task queue configured to store targeting tasks, and a bidding task queue configured to store bidding tasks.

In some implementations, a task prioritization agent 220 can retrieve the unprioritized tasks 218 from the task queues 210, prioritize the tasks, and generate a prioritized task list indicating a sequence of executing the tasks. In some cases, the task prioritization agent 220 can store the prioritized tasks 228 and/or the prioritized task list in the task queues 210. In some cases, the task prioritization agent 220 can transmit the prioritized tasks 228 and/or the prioritized task list to the execution agent 230 directly (not shown). In some implementations, the task prioritization agent 220 can retrieve task prioritization configurations 226 from a task prioritization configuration database 224. The task prioritization configurations 226 can include, for example, one or more rules for prioritizing the tasks.

The tasks can be prioritized based on various rules. In some cases, the tasks can be prioritized based on the tasks' dependency relationships. For example, assume that three tasks are to be prioritized: the first task is generating an image for an advertisement, the second task is generating a text for the advertisement, the third task is allocating the budget for the advertisement. The first and the second tasks can be prioritized over the third task because an advertisement needs to be created first before considering how much budget is allocated to the advertisement. In some cases, the tasks can be prioritized based on the tasks' timing constraints. For example, assume that a task is extracting information from an advertisement campaign and using the information to retrain the generative model. Since the model retraining can take some time, this task can be prioritized so enough time can be provided to retrain the model. In some implementations, after the task prioritization agent 220 generates a prioritized task list, the AI system 202 can transmit the prioritized task list to the client device 204, so the user can review, edit, and/or approve the prioritized task list.

In some cases, the execution agent 230 can obtain the prioritized tasks 228 from the task queues 210 and/or the task prioritization agent 220 and execute the prioritized tasks 228. In some cases, after executing a task, the execution agent 230 can transmit the task and its execution result (e.g., in the form of <task, result> pair 232) to a memory 236 for storage. The executed task and its execution result can be a part of the context data stored by the memory 236. Additionally, the memory 236 can store other context data, including, for example, performance data, information for executing a task, or other type of context data.

In some implementations, the execution agent 230 can transmit a query 234 for context data to the memory 236 to retrieve the context data 238. The context data 238 can be used by the execution agent 230 to execute tasks. In one example, the execution agent 230 cannot execute a task unless its preceding task(s) has been completed. The execution agent 230 can retrieve information about the completed tasks—which can be a part of the context data 238—from the memory 236 and use the context data to determine whether a task can be executed. In another example, a task to be executed can be serving an advertisement, and the context data 238 can include information for executing the serving, such as information from the publisher side, information from the client side, or other type of information. In yet another example, the context data 238 can include performance data of an advertisement campaign. The execution agent 230 can use the performance data to determine whether the advertisement campaign has been completed. For example, assume that the task is to increase the CVR by 5%. If the performance data indicates that the CVR has been increased by 5%, the execution agent 230 can determine that the advertisement campaign has completed.

In some examples, the execution agent 230 can use the generative model 260 to complete tasks. For example, assuming that the task is generating a digital component. The execution agent 230 can generate an input prompt 252 including data for generating the digital component. The AI system 202 can transmit the input prompt 252 to the generative model 260, and receive model output 254 including the digital component generated by the generative model 260 responsive to the input prompt 252.

In some implementations, the execution agent 230 can transmit the task execution results 240 to the task creation agent 208. Additionally, the task creation agent 208 can transmit a query 242 for context data to the memory 236 to obtain context data 244. The task creation agent 208 can use the task execution results 240 and/or the context data 244 to generate one or more additional tasks. For example, if the task execution results 240 indicate that an advertisement campaign has been completed, the task creation agent 208 can create another task for an additional advertisement campaign at a future date.

In some cases, a summarization agent 246 can retrieve context data 248 from the memory 236, generate a summary 250 using the context data 248, and transmit the summary 250 to the client device 204. The summary 250 can include, for example, the statuses of the tasks, performance data associated with the task, or other suitable information of a summary. In some cases, the summarization agent 246 can generate and transmit a summary upon the occurrence of a particular event. For example, the summarization agent 246 can generate and transmit a summary when a predetermined number of tasks have been completed. In some cases, the summarization agent 246 can generate and transmit a summary periodically (e.g., every seven days or thirty days).

Figure 3:
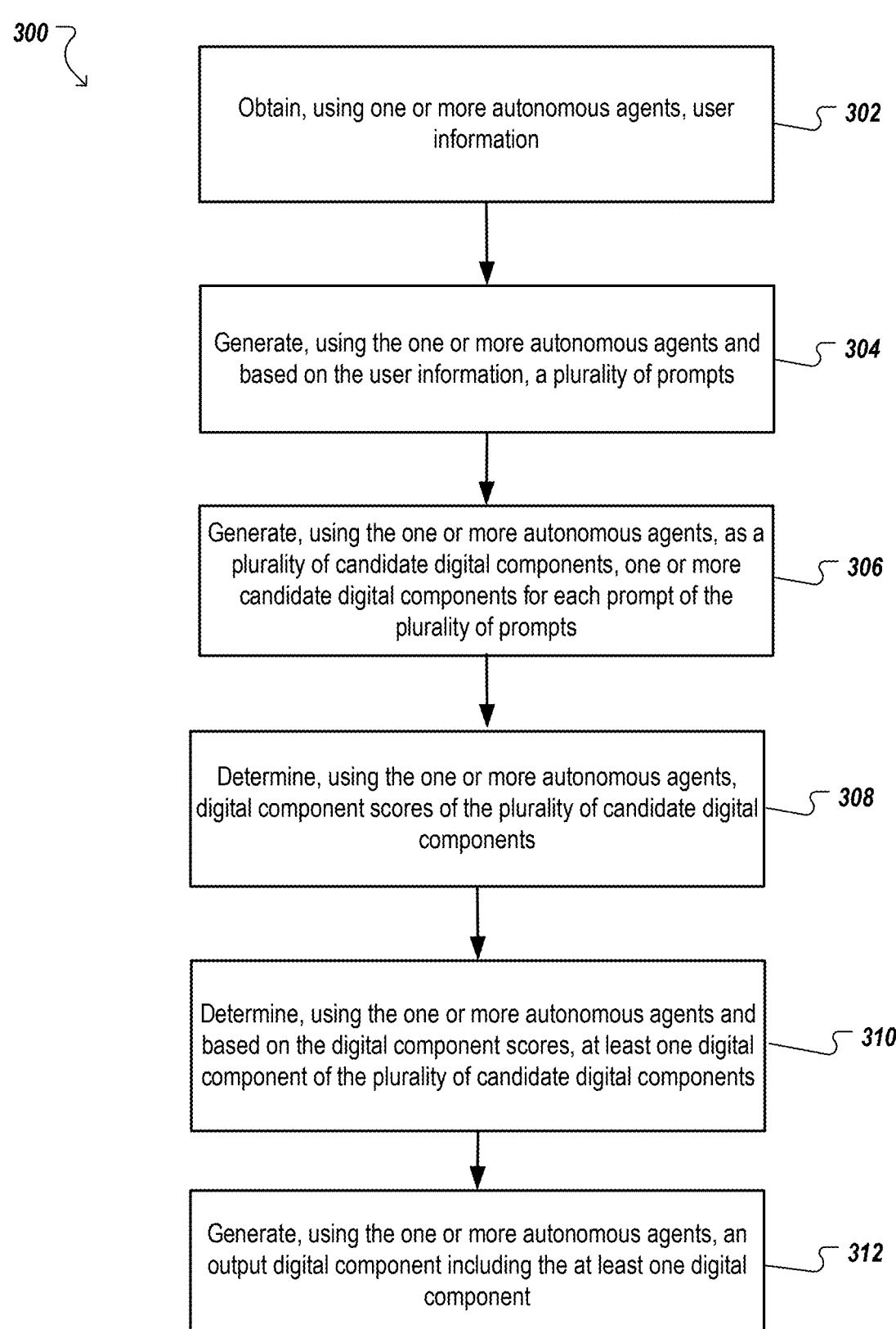
FIG. 3 is a flow chart of an example process for using autonomous agents to automate digital component task generation and execution, according to an implementation of the present disclosure.

FIG. 3 is a flow chart of an example process 300 for using autonomous agents to automate digital component task generation and execution, according to an implementation of the present disclosure. Operations of the process 300 can be performed, for example, by the service apparatus 110 of FIG. 1, the AI system 202 of FIG. 2, or another data processing apparatus. The operations of the process 300 can also be implemented as instructions stored on a computer readable medium, which can be non-transitory. Execution of the instructions, by one or more data processing apparatus, causes the one or more data processing apparatus to perform operations of the process 300.

In some cases, an AI system (e.g., the AI system 202) including one or more autonomous agents can perform the operations of the process 300. In some cases, the one or more autonomous agents includes at least one of a task creation agent (e.g., the task creation agent 208), a task prioritization agent (e.g., the task prioritization agent 220), an execution agent (e.g., the execution agent 230), and a summarization agent (e.g., the summarization agent 246). In some implementations, the AI system receives a query (e.g., the query 206) indicating a user's objective (e.g., "increasing the sale of product X by Y % within a budget of Z"). The AI system can use, for example, the task creation agent to generate one or more tasks for achieving the user's objective, and the task(s) can include generating a digital component.

In some cases, the task creation agent can generate sub-tasks for the task of generating the digital component. In some implementations, the task creation agent can generate the sub-tasks using, for example, sub-agents as described with respect to FIG. 2. The sub-tasks can include, for example, obtaining user information, generating, based on the user information, a plurality of prompts, generating, as a plurality of candidate digital components, one or more candidate digital components for each prompt of the plurality of prompts, determining digital component scores of the plurality of candidate digital components, determining, based on the digital component scores, at least one digital component of the plurality of candidate digital components, and generating an output digital component including the at least one digital component.

In some implementations, the AI system can prioritize the sub-tasks using, for example, the task prioritization agent using the operations described with respect to FIG. 2. After the prioritization, the sequence of executing the sub-tasks can be obtaining user information, generating, based on the user information, a plurality of prompts, generating, as a plurality of candidate digital components, one or more candidate digital components for each prompt of the plurality of prompts, determining digital component scores of the plurality of candidate digital components, determining, based on the digital component scores, at least one digital component of the plurality of candidate digital components, and generating an output digital component including the at least one digital component.

In some cases, the AI system can execute the sub-tasks in the sequence as determined by the task prioritization agent using, for example, the execution agent using the operations described with respect to FIG. 2. More details with respect to the sub-tasks are described below.

At 302, the AI system obtains, using one or more autonomous agents, user information. The user information can include, for example, information from digital components of the user (e.g., headline or description from a digital component of the user, images from a digital component of the user, or other suitable information from the digital components), the user's background information (e.g., a URL to a landing page associated with the user), and/or the user's preferences.

In some cases, the user information can include, for example, information from digital components of the user. In some cases, the user can upload, to the AI system, one or more input digital components (e.g., images, text, and videos) associated with the query (whether as a part of the query or not), and the input digital component(s) can be used to create output digital components. For example, the input digital component(s) can be digital component(s) previously generated for the user. In some examples, the AI system can obtain information from the input digital component(s) using a machine learning model. The machine learning model can be, for example, a LLM trained to generate an output describing attributes of a digital component based on taking the digital component as an input. For example, after receiving an input digital component, the machine learning model can output descriptions about the features of the input digital component, headline(s) included in the input digital component, or other suitable attributes of the input digital component.

In some implementations, the user information can include, for example, additional query data submitted by the user to the AI system, where the additional query data can include data not in the query and can limit digital components generated by the AI system. In some examples, the AI system can collect, as user information, additional query data not input directly by the user. The additional query data and the methods for obtaining the additional query data can be similar to or the same as those described with respect to FIG. 2, and the details are omitted here for brevity.

Table 1 shows an example of the obtained user information:

TABLE 1

| User_id | 1100162063 |
|---|---|
| Digital component_id | 680746233084 |
| Entity_name | Fresh ™ |
| User_url | https://www.fresh.ie/pages/resolution?c=FBOX |
| Headline | Code FBOX |
| | Meals delivered to your home |
| | Cozy home-cooking made easy |
| | Use code FBOX |
| | Up to $85 off with Fresh |
| Description | Make tasty, wholesome recipes using top-quality ingredients. |
| | Relax at dinnertime and enjoy a delicious home-cooked meal. Get up to $85 off. |
| | Enjoy pre-planned meals when you order delicious dinners with Fresh. Use code: FBOX |
| | Choose your perfect menu from a selection of 15+ weekly recipes. Use code: FBOX |
| | Try Fresh and cook wholesome meals using fresh ingredients delivered to your door. |

At 304, the AI system generates, using the one or more autonomous agents and based on the user information, a plurality of prompts. In some cases, the AI system inputs the user information into a machine learning model, such as an LLM. The machine learning model can analyze the user information to generate an understanding of the output digital component to be generated, such as the industry the user is in, the products associated with the output digital component, the target audiences of the output digital component, the pain points the products associated with the output digital component aim to address, and/or the benefits of the products associated with the output digital component. Table 2 shows an example of the understanding of the output digital component to be generated.

TABLE 2

| Name | Fresh |
|---|---|
| Industry | Food & Drink |
| Products | ['Meal kits', 'Pre-planned meals', 'Fresh ingredients'] |
| Target audiences | ['Busy people', 'People who want to cook healthy meals'] |
| Pain points | ['Lack of time', 'Lack of cooking skills', 'Expensive ingredients'] |
| Benefits | ['Convenient', 'Healthy', 'Affordable'] |

The machine learning model can generate, based on the understanding of the output digital component to be generated, ideas for generating candidate digital components. Some example ideas for generating candidate digital components are listed below:

A photo of a delicious home-cooked meal with the Fresh logo on the plate

A photo of a smiling person enjoying a Fresh meal

A photo of a person cooking with Fresh ingredients

A photo of a Fresh delivery box on a doorstep

A video of someone making a Fresh meal

The AI system can generate a plurality of prompts based on the ideas. In some cases, the machine learning model can generate a prompt corresponding to each idea. In some examples, the prompt can include the idea and a set of constraints generated based on, for example, the user information. For example, the AI system can insert into the prompt one or more of the entity attribute(s) corresponding to the entity as described with respect to step 302. In some implementations, the one or more of the entity attribute(s) inserted into the prompt operates as a contextual constraint that limits content created by a generative model responsive to the prompt. For example, the entity attribute(s) can limit the content created by the generative model to subject matter specified by the entity attribute(s) that is included in the prompt as a contextual constraint.

For example, assume that the idea is "a photo of a delicious home-cooked meal with the Fresh logo on the plate" and that the user information indicates that the digital component is intended for distribution to users in the United States who are interested in the meal kits products. The prompt can take the following form:

Generate a good_output: a digital component where the query is "A photo of a delicious home-cooked meal with the Fresh logo on the plate." The good_output should be directed to the meal kit products in the United States.

At 306, the AI system generates, using the one or more autonomous agents, as a plurality of candidate digital components, one or more candidate digital components for each prompt of the plurality of prompts. In some cases, the AI system can transmit the prompts to a generative model (e.g., the generative model 260). The generative model can then generate, based on each prompt, one or more candidate digital components for the prompt, and transmit the candidate digital components to the AI system as model output. In some cases, the AI system can receive a plurality of original digital components (e.g., original images) associated with the query. The generative model can generate a plurality of candidate digital components (e.g., advertisements) using the original digital components, where each of the plurality of candidate digital components includes at least one of the plurality of original digital components.

Figure 4:
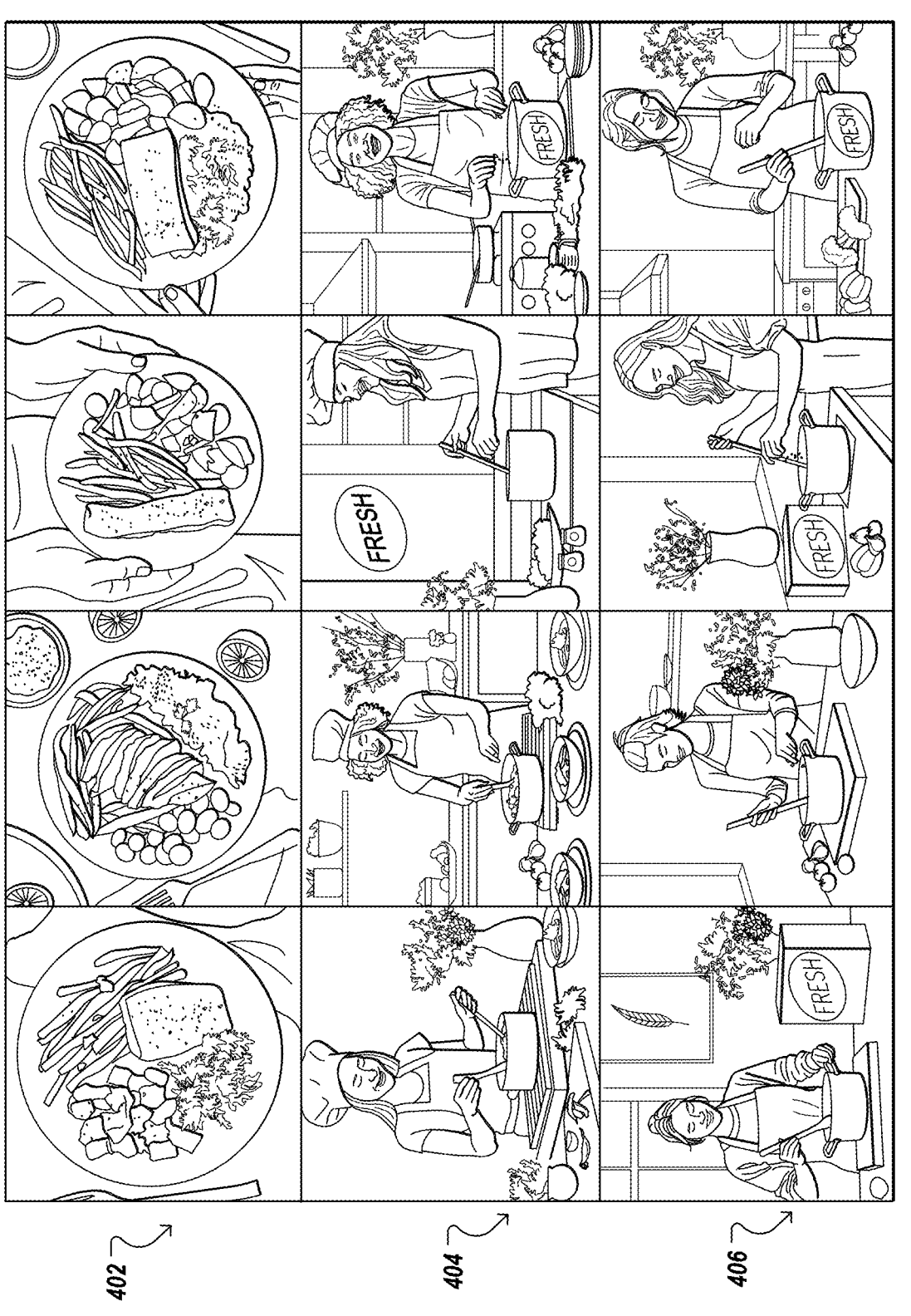
FIG. 4 shows examples of candidate digital components generated by the AI system, according to an implementation of the present disclosure.

FIG. 4 shows examples of candidate digital components generated by the AI system, according to an implementation of the present disclosure. The set of candidate digital components 402 can be generated based on the idea of "a photo of a delicious home-cooked meal on the plate." The set of candidate digital components 404 can be generated based on the idea of "a photo of a person wearing a chef hat cooking with Fresh ingredients." The set of candidate digital components 406 can be generated based on the idea of "a photo of a person not wearing a chef hat cooking with Fresh ingredients."

At 308, the AI system determines, using the one or more autonomous agents, digital component scores of the plurality of candidate digital components. In some cases, digital component score is a measurement of quality of a candidate digital component, and the AI system can use a quality evaluation model and/or a performance evaluation model to generate the digital component score of the candidate digital component.

The quality evaluation model can be, for example, a machine learning model specially trained for determining qualities of images and/or videos. In some cases, the quality evaluation model can take a candidate digital component as input and output a digital component score of the candidate digital component.

The performance evaluation model can be, for example, a machine learning model trained to generate predicted performance data of the candidate digital component. Examples of performance data include but not limited to, CTR, CVR, CPD, and other user actions. In some situations, digital components distributed by the AI system may not be optimal for the environment in which the generated digital component is presented. In these situations, the sub-optimal nature of the digital component will be evidenced by low performance data for the digital component. While the exact performance metrics used are not critical for the implementation of the present innovations, easily understandable metrics include engagement metrics with the digital component, such as presentation time of the digital component, rates of interaction with the digital component, and submission of affirmative user feedback regarding presentation of the digital component (e.g., a "+1", "like", or positive survey response regarding the digital component). Whatever the chosen metric, less optimal digital components will generally have a lower performance measure with respect to the chosen metric, and more optimal digital components will generally have a higher performance measure with respect to the chosen metric. Therefore, in some cases, performance data can be used to measure the quality of a candidate digital component. For example, the digital component score can be equal to or in proportional to the performance data.

At 308, the AI system determines, using the one or more autonomous agents and based on the digital component scores, at least one digital component of the plurality of candidate digital components. In some cases, the AI system can identify at least one digital component from the plurality of candidate digital components. The at least one digital component can have, for example, the highest digital component score, a digital component score within a specified range, or at least a specified digital component score.

Figure 5:
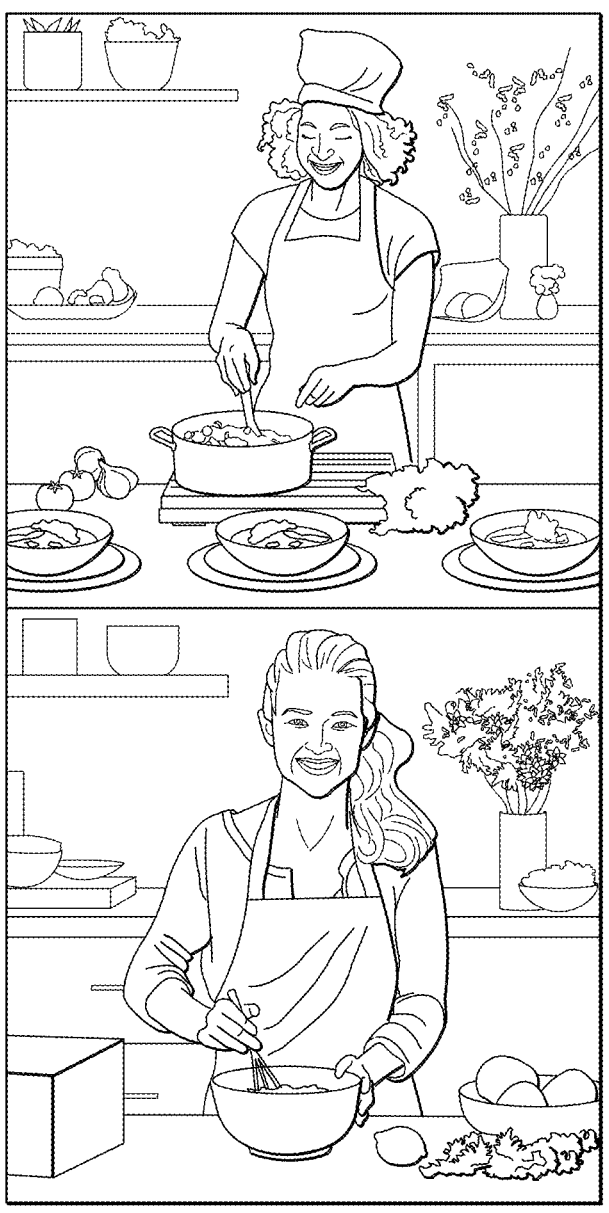
FIG. 5 shows examples of two digital components identified from a plurality of candidate digital components, according to an implementation of the present disclosure.

FIG. 5 shows examples of two digital components identified from a plurality of candidate digital components, according to an implementation of the present disclosure. The two digital components can be identified from a set of candidate digital components, and each of the two digital components can have, for example, the highest digital component score, a digital component score within a specified range, or at least a specified digital component score. In some cases, the two digital components can be further evaluated to determine one digital component for generating the output digital component. For example, one or more evaluators and/or the AI system can evaluate the two digital components to identify the digital component that will likely achieve better performance.

At 310, the AI system generates, using the one or more autonomous agents, an output digital component including the at least one digital component. In some cases, the AI system inputs the at least one digital component into a rendering model to generate the output digital component. In some cases, the rendering model can combine more than one digital components to generate the output digital component. For example, the rendering model can combine at least two of a background image, a main image, a network location (e.g., a URL), a text, a logo, a code, or any suitable digital component.

In some cases, the rendering model can perform rendering, including rendering and formatting the output digital component to visually match/blend with the publisher's website or app layout. The rendering model can generate the necessary HyperText Markup Language (HTML), images, or video components to display the output digital component. In some examples, the rendering model can perform digital component delivery—the rendered output digital component is transmitted to the publisher's website or app, where it is displayed to the user in the designated digital component space.

Figure 6:
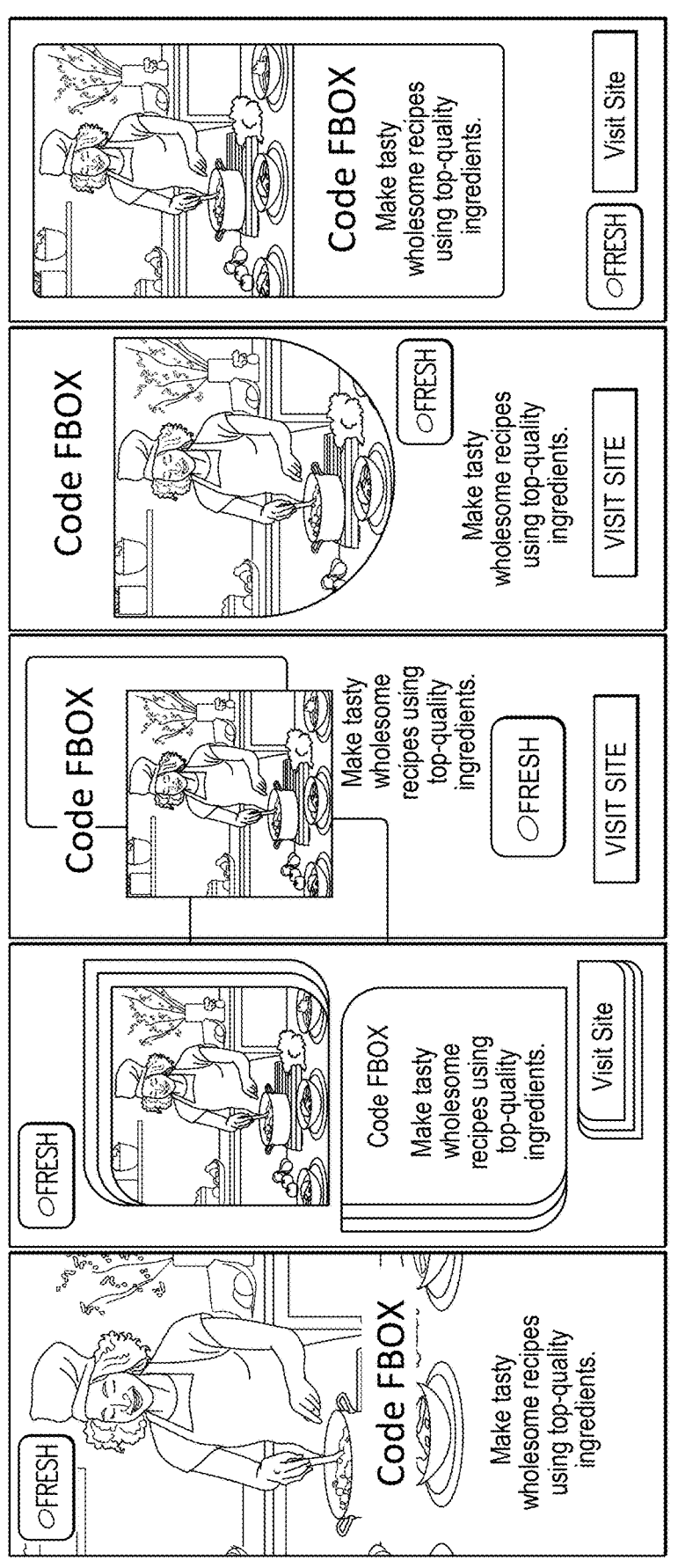
FIG. 6 shows example output digital components, according to an implementation of the present disclosure.

FIG. 6 shows example output digital components, according to an implementation of the present disclosure. As shown, each of these five output digital components includes a background image, a main image, a network location (the "visit site" button), a Fresh logo, a code FBOX, and a text "Make tasty, wholesome recipes using top-quality ingredients." As shown, the five output digital components can differ in one or more aspects. For example, the Fresh logo appears in a different location and the code FBOX has a different font size in each of the five output digital components. In some cases, all five output digital components can be served to the audiences. In some cases, the five output digital components can be further evaluated to determine one output digital component to, for example, serve to the audiences. For example, one or more evaluators and/or the AI system can evaluate the five output digital components to identify an output digital component that will likely achieve better performance.

In some cases, the AI system can use the one or more autonomous agents to create a digital component group. A digital component group can include digital components that will be, for example, distributed in the same geographic location, in the same vertical industry, and/or to the same group of audiences. In some implementations, the AI system receives a query (e.g., the query 206) indicating a user's objective (e.g., "increasing the sale of product X by Y % within a budget of Z"). The AI system can use, for example, the task creation agent to generate one or more tasks for achieving the user's objective, and the task(s) can include generating a digital component group.

In some cases, the task creation agent can generate sub-tasks for the task of generating the digital component group. In some implementations, the task creation agent can generate the sub-tasks using, for example, sub-agents as described with respect to FIG. 2. The sub-tasks can include, for example, determining target audiences associated with the digital component group, determining a bidding strategy associated with the digital component group, and adding at least one output digital component to the digital component group.

In some cases, determining the target audiences associated with the digital component group includes, for example, determining the education level, income level, occupation(s), age group, gender, family status, geographic location, hobbies, lifestyle, and/or values/beliefs of the audiences that the digital components of the digital component group will be distributed to. In some cases, determining a bidding strategy associated with the digital component group includes determining a budget level of the user who submitted the query, and determining the bidding strategy based on the budget level. Examples of bidding strategy include but not limited to Cost-Per-Click (CPC), Cost-Per-Action (CPA), and Target Cost-Per-Acquisition (Target CPA).

In some examples, determining the bidding strategy associated with the digital component group includes identifying an additional digital component group similar to the digital component group, and determining the bidding strategy associated with the digital component group based on an additional bidding strategy associated with the additional digital component group. Identifying an additional digital component group similar to the digital component group can include, for example, identifying an additional digital component group having the same or similar target audiences as the digital component group being created. Determining the bidding strategy associated with the digital component group based on an additional bidding strategy associated with the additional digital component group can include, for example, using the bidding strategy of the additional digital component group as the bidding strategy of the digital component group and/or determining the bidding strategy associated with the digital component group based on analyzing statistics of the additional digital component group (e.g., bidding strategy and/or return over investment). As an example, the AI system can identify an additional digital component group having the same or similar target audiences as the digital component group being created and use the bidding strategy of the additional digital component group as the bidding strategy of the digital component group.

In some implementations, adding at least one output digital component to the digital component group can include copying at least one output digital component of another digital component group to the digital component group being created and/or generating at least one output digital component using operations described with respect to FIG. 3 and adding the generated at least one output digital component to the digital component group. In some cases, copying at least one output digital component of another digital component group can include identifying another digital component group similar to (e.g., having the same or similar target audiences and/or bidding strategy as) the digital component group being created, and copying at least one output digital component of the identified digital component group to the digital component group being created.

Figure 7:
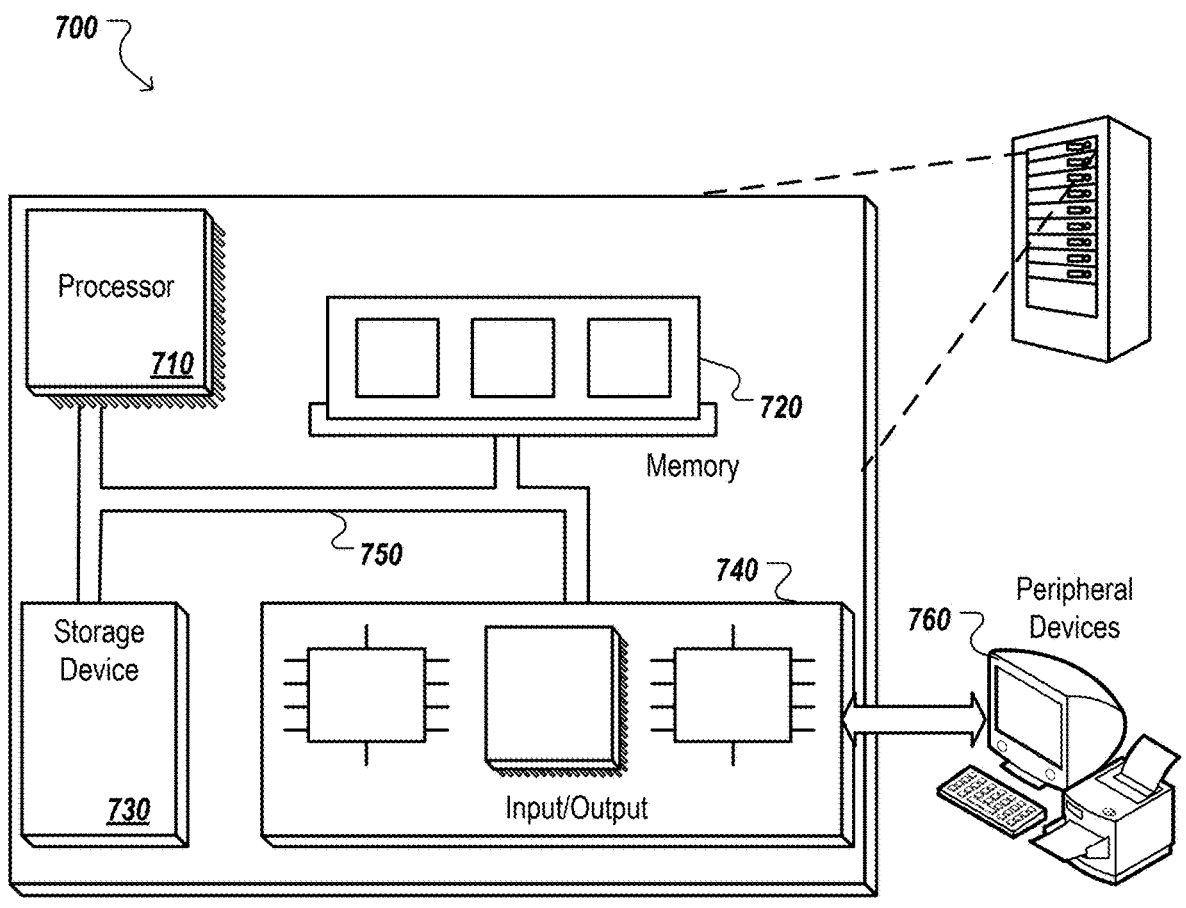
FIG. 7 is a block diagram of an example computer system that can be used to perform described operations, according to an implementation of the present disclosure.

FIG. 7 is a block diagram of an example computer system 700 that can be used to perform described operations, according to an implementation of the present disclosure. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In one implementation, the input/output device 740 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 760. Other implementations, however, can also be used, such as mobile computing devices, mobile communication devices, and set-top box television client devices.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

For situations in which the systems discussed here collect and/or use personal information about users, the users may be provided with an opportunity to enable/disable or control programs or features that may collect and/or use personal information (e.g., information about a user's social network, social actions or activities, a user's preferences, or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, a gaming service, or any other service.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory (RAM) or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving a query indicating an objective;
generating one or more tasks to achieve the objective, the one or more tasks comprising generating an output digital component and generating a digital component group;
creating, using one or more autonomous agents, a plurality of subtasks for generating the output digital component;
creating, using the one or more autonomous agents, an additional plurality of subtasks for generating the digital component group, wherein the additional plurality of subtasks for generating the digital component group comprises determining target audiences associated with the digital component group, determining a bidding strategy associated with the digital component group, and adding at least one output digital component to the digital component group;
obtaining, using the one or more autonomous agents, user information;
generating, using the one or more autonomous agents and based on the user information, a plurality of prompts;
generating, using the one or more autonomous agents, as a plurality of candidate digital components, one or more candidate digital components for each prompt of the plurality of prompts;
determining, using the one or more autonomous agents, digital component scores of the plurality of candidate digital components;
determining, using the one or more autonomous agents and based on the digital component scores of the plurality of candidate digital components, at least one digital component of the plurality of candidate digital components; and
generating, using the one or more autonomous agents, an output digital component including the at least one digital component.

2. The computer-implemented method of claim 1, wherein generating, using the one or more autonomous agents and based on the user information, the plurality of prompts comprises:
inputting the user information into a machine learning model;

obtaining, from the machine learning model, ideas for generating candidate digital components; and generating the plurality of prompts based on the ideas.

3. The computer-implemented method of claim 1, wherein the at least one digital component has a highest digital component score among the plurality of candidate digital components.

4. The computer-implemented method of claim 1, wherein generating, using the one or more autonomous agents, the output digital component including the at least one digital component comprises:

inputting the at least one digital component into a rendering model to generate the output digital component.

5. The computer-implemented method of claim 1, wherein the plurality of subtasks comprises obtaining the user information, generating the plurality of prompts, generating the plurality of candidate digital components, determining the digital component scores of the plurality of candidate digital components, determining the at least one digital component of the plurality of candidate digital components, and generating the output digital component including the at least one digital component.

6. The computer-implemented method of claim 5, wherein the computer-implemented method comprises:

automatically executing, using the one or more autonomous agents, the plurality of subtasks.

7. The computer-implemented method of claim 1, wherein determining the bidding strategy associated with the digital component group comprises:

identifying an additional digital component group similar to the digital component group; and determining the bidding strategy associated with the digital component group based on an additional bidding strategy associated with the additional digital component group.

8. The computer-implemented method of claim 1, wherein adding the at least one output digital component to the digital component group comprises:

adding the output digital component to the digital component group.

9. A computer-implemented artificial intelligence (AI) system comprising:

one or more processors; and one or more storage devices storing instructions that, when executed by the one or more processors, cause the one or more processors to perform operations comprising:

receiving a query indicating an objective;

generating one or more tasks to achieve the objective, the one or more tasks comprising generating an output digital component and generating a digital component group;

creating, using one or more autonomous agents, a plurality of subtasks for generating the output digital component;

creating, using the one or more autonomous agents, an additional plurality of subtasks for generating the digital component group, wherein the additional plurality of subtasks for generating the digital component group comprises determining target audiences associated with the digital component group, determining a bidding strategy associated with the digital component group, and adding at least one output digital component to the digital component group;

obtaining, using the one or more autonomous agents, user information;

generating, using the one or more autonomous agents and based on the user information, a plurality of prompts;

generating, using the one or more autonomous agents, as a plurality of candidate digital components, one or more candidate digital components for each prompt of the plurality of prompts;

determining, using the one or more autonomous agents, digital component scores of the plurality of candidate digital components;

determining, using the one or more autonomous agents and based on the digital component scores of the plurality of candidate digital components, at least one digital component of the plurality of candidate digital components; and generating, using the one or more autonomous agents, an output digital component including the at least one digital component.

10. The computer-implemented AI system of claim 9, wherein generating, using the one or more autonomous agents and based on the user information, the plurality of prompts comprises:

inputting the user information into a machine learning model;

obtaining, from the machine learning model, ideas for generating candidate digital components; and generating the plurality of prompts based on the ideas.

11. The computer-implemented AI system of claim 9, wherein the at least one digital component has a highest digital component score among the plurality of candidate digital components.

12. The computer-implemented AI system of claim 9, wherein generating, using the one or more autonomous agents, the output digital component including the at least one digital component comprises:

inputting the at least one digital component into a rendering model to generate the output digital component.

13. The computer-implemented AI system of claim 9, the operations comprising:

receiving a query indicating an objective;

generating one or more tasks to achieve the objective, the one or more tasks comprising generating the output digital component; and creating, using the one or more autonomous agents, a plurality of subtasks for generating the output digital component.

14. The computer-implemented AI system of claim 13, wherein the plurality of subtasks comprises obtaining the user information, generating the plurality of prompts, generating the plurality of candidate digital components, determining the digital component scores of the plurality of candidate digital components, determining the at least one digital component of the plurality of candidate digital components, and generating the output digital component including the at least one digital component.

15. The computer-implemented AI system of claim 14, wherein the operations comprise:

automatically executing, using the one or more autonomous agents, the plurality of subtasks.

16. The computer-implemented AI system of claim 13, wherein the one or more tasks comprises generating a digital component group, and the operations comprise:

creating, using the one or more autonomous agents, an additional plurality of subtasks for generating the digital component group, wherein the additional plurality of subtasks for generating the digital component group comprises determining target audiences associated with the digital component group, determining a bidding strategy associated with the digital component group, and adding at least one output digital component to the digital component group.

17. The computer-implemented AI system of claim 16, wherein determining the bidding strategy associated with the digital component group comprises:

identifying an additional digital component group similar to the digital component group; and determining the bidding strategy associated with the digital component group based on an additional bidding strategy associated with the additional digital component group.

18. One or more non-transitory computer readable medium storing instructions, that when executed by a computer-implemented artificial intelligence (AI) system, causes the computer-implemented AI system to perform operations comprising:

receiving a query indicating an objective;

generating one or more tasks to achieve the objective, the one or more tasks comprising generating an output digital component and generating a digital component group;

creating, using one or more autonomous agents, a plurality of subtasks for generating the output digital component;

creating, using the one or more autonomous agents, an additional plurality of subtasks for generating the digital component group, wherein the additional plurality of subtasks for generating the digital component group comprises determining target audiences associated with the digital component group, determining a bidding strategy associated with the digital component group, and adding at least one output digital component to the digital component group;

obtaining, using the one or more autonomous agents, user information;

generating, using the one or more autonomous agents and based on the user information, a plurality of prompts;

generating, using the one or more autonomous agents, as a plurality of candidate digital components, one or more candidate digital components for each prompt of the plurality of prompts;

determining, using the one or more autonomous agents, digital component scores of the plurality of candidate digital components;

determining, using the one or more autonomous agents and based on the digital component scores of the plurality of candidate digital components, at least one digital component of the plurality of candidate digital components; and generating, using the one or more autonomous agents, an output digital component including the at least one digital component.

\* \* \* \* \*